US009999922B1

(12) United States Patent
Struve (10) Patent No.: US 9,999,922 B1
(45) Date of Patent: Jun. 19, 2018

(54) MOLDABLE COMPOSITION FOR USE IN HAND OR MACHINE FORMING AN ARTICLE

(71) Applicant: William George Struve, Wilmington, NC (US)

(72) Inventor: William George Struve, Wilmington, NC (US)

(*) Notice: Subject to any disclaimer, the term of this patent is extended or adjusted under 35 U.S.C. 154(b) by 595 days.

(21) Appl. No.: 14/510,830

(22) Filed: Oct. 9, 2014

(51) Int. Cl.
*B22F 1/00* (2006.01)
*B33Y 70/00* (2015.01)

(52) U.S. Cl.
CPC ............ *B22F 1/0059* (2013.01); *B33Y 70/00* (2014.12)

(58) Field of Classification Search
CPC .................................................. B22F 1/0059
See application file for complete search history.

(56) References Cited

U.S. PATENT DOCUMENTS

| | | | |
|---|---|---|---|
| 5,380,179 A * | 1/1995 | Nishimura | B22F 1/0059 106/285 |
| 5,427,595 A | 6/1995 | Pihl et al. | 51/298 |
| 5,738,817 A | 4/1998 | Danforth et al. | 264/603 |
| 5,900,207 A | 5/1999 | Danforth et al. | 264/603 |
| 6,261,336 B1 * | 7/2001 | Behi | B22F 1/0059 419/10 |
| 6,291,560 B1 * | 9/2001 | Behi | B22F 1/0059 264/109 |
| 6,689,184 B1 * | 2/2004 | Morris | B22F 1/0059 419/36 |
| 7,189,277 B2 * | 3/2007 | Morris | B22F 1/0059 75/255 |
| 2013/0266816 A1 | 10/2013 | Xu | 428/450 |
| 2014/0265048 A1 | 9/2014 | Burris et al. | 264/497 |
| 2014/0265049 A1 | 9/2014 | Burris et al. | 264/497 |

OTHER PUBLICATIONS

Metal Clay Magic, "The Basics of Sintering Carbon-Fired Clay," http://metalclaymagic.com/2013/02/the-basics of sintering-carbon-fired-clay-2/ dated Feb. 6, 2013.
Metal Clay Magic, "Deciphering Test Strips," http://metalclaymagic.com/2013/03/deciphering-test-strips/ dated Mar. 24, 2013.

* cited by examiner

*Primary Examiner* — Devang R Patel
(74) *Attorney, Agent, or Firm* — MacCord Mason PLLC (57) ABSTRACT

A moldable composition for use in hand or machine forming an article. In one embodiment, the composition including at least 78 wt. % of one fine metal-based powder; a water dispersible binder; and between about 2 wt. % and about 20 wt. % water, wherein the extrusion rate of the composition through about a 1½ mm nozzle is between about 0.05 gm/min and about 5 gm/min at a pressure of 120 PSI. The composition may further include up to about 2 wt. % of molding additives to improve the stability of the composition during molding and to improve the physical properties of the composition after drying.

34 Claims, 4 Drawing Sheets

MOLDABLE COMPOSITION FOR USE IN HAND OR MACHINE FORMING AN ARTICLE

BACKGROUND OF THE INVENTIONS

(1) Field

The present inventions relate generally to moldable compositions and, more particularly, to a metal-based moldable composition for use in hand or machine forming an article such as for making metal articles with 3D printers.

(2) Related Art

Currently there are a number of solutions for making metal articles utilizing 3D printers. Some of these solutions attempt to selectively bind portions of a bed of metal powder by spraying a binder solution on the powder and sintering the bound portions. Another method is to selectively fuse portions of the metal powder with heat from a laser or electron beam, but these two solutions fail to meet the needs of the industry because a large excess of metal powder must be used and the excess metal powder subsequently removed.

Other solutions attempt 3D printing of fused metal, but these solutions are similarly unable to meet the needs of the industry because this requires high temperature and the deposition of the metal in a finely controlled fashion has not been achieved, so extensive finishing is required after printing of the article.

Still other solutions seek to combine a metal powder with a fusible material into a fiber or filament and subsequently melt the combination and extrude the melt, but these solutions also fail to meet industry needs because such fibers or filaments are not able to be wound on spools to provide continuous operation of a 3D printer, the fusible material requires an extended period for removal, and the printed article may melt during sintering.

Thus, there remains a need for new and improved metal-based, moldable compositions for use in hand or machine forming an article which is sufficiently plastic to be extruded at low pressures through a small nozzle while, at the same time, has improved stability by reducing the rate of oxidation of the metal-based powder during storage and forming and also improved physical properties of the article after forming and drying by remaining hand carvable prior to sintering.

SUMMARY OF THE INVENTIONS

The present inventions are directed to a moldable composition for use in hand or machine forming an article. In one embodiment, the composition including at least 78 wt. % of one fine metal-based powder; a water dispersible binder; and between about 2 wt. % and about 20 wt. % water, wherein the extrusion rate of the composition through about a 1½ mm nozzle is between about 0.05 gm/min and about 5 gm/min at a pressure of 120 PSI. The composition may further include up to about 2 wt. % of molding additives to improve the stability of the composition during molding and to improve the physical properties of the composition after drying.

The metal-based powders are selected from the group consisting of fine metal powders, fine metal oxide powders and mixtures thereof.

In one embodiment, the fine metal powders are selected from the group consisting of fine metal powders, the oxides of which can be reduced by carbon monoxide, such as copper, bismuth, nickel, cobalt, molybdenum, germanium, tungsten, tin, iron, vanadium, alloys of these metals and mixtures thereof. In another embodiment, the fine metal powders are selected from the group consisting of fine metal powders, the oxides of which cannot be reduced by carbon monoxide, such as titanium, aluminum, alloys of these metals with copper, bismuth, nickel, cobalt, molybdenum, germanium, tungsten, tin, iron, vanadium and mixtures thereof.

In one embodiment, the fine metal oxide powders are selected from the group consisting of fine metal oxide powders that can be reduced by carbon monoxide, such as copper oxide, bismuth oxide, nickel oxide, cobalt oxide, molybdenum oxide, germanium oxide, tungsten oxide, tin oxide, iron oxide, vanadium oxide and mixtures thereof. In another embodiment, the fine metal oxide powders are selected from the group consisting of fine metal oxide powders that cannot be reduced by carbon monoxide, such as titanium oxide, aluminum oxide and mixtures thereof.

In one embodiment, the metal-based powders are about 325 mesh and preferably less than about 325 mesh.

In one embodiment, the proportion of the fine metal-based powders is between about 78 wt. % and about 90 wt. % when the shape of the powder particles is irregular such as metal powder made by reduction.

In another embodiment, the proportion of the fine metal-based powders is between about 83 wt. % and about 95 wt. % when the shape of the powder particles is roughly spherical such as metal powder made by spraying or atomization.

The proportion of the water dispersible binder may be between about 0.2 wt. % and about 2 wt. %. In addition, the water dispersible binder may be selected from the group consisting of xanthan gum, carboxymethyl-cellulose, methyl cellulose, polyvinyl alcohol, guar gum, sodium alginate, starch, polyvinyl alcohol and mixtures thereof.

Also, the molding additives may be selected from the group consisting of ethanol, isopropyl alcohol, propylene glycol, glycerol, polyethylene glycol, polyoxyethylene, polyvinyl alcohol and mixtures thereof.

The composition may be further adapted for extrusion, such as for extrusion through a fine nozzle. For example, the composition may be adapted for extrusion through a fine nozzle having a diameter of about ½ mm. The composition also may be adapted for extrusion through a fine nozzle having a diameter of between about ½ mm and about 1½ mm. For example, the composition may be adapted for extrusion by a 3D printer.

Accordingly, one aspect of the present inventions is to provide a moldable composition for use in hand or machine forming an article, the composition including at least one fine, sinterable metal-based powder; a water dispersible binder; and the balance water, wherein the extrusion rate of the composition through about a 1½ mm nozzle is between about 0.05 gm/min and about 5 gm/min at a pressure of 120 PSI.

Another aspect of the present inventions is to provide a moldable composition for use in hand or machine forming an article, the composition including at least 78 wt. % of one fine metal-based powder; a water dispersible binder; and between about 2 wt. % and about 20 wt. % water, wherein the extrusion rate of the composition through about a 1½ mm nozzle is between about 0.05 gm/min and about 5 gm/min at a pressure of 120 PSI.

Still another aspect of the present inventions is to provide a moldable composition for use in hand or machine forming an article, the composition including at least 78 wt. % of one fine metal-based powder; a water dispersible binder; up to about 2 wt. % of molding additives to improve the stability of the composition during molding and to improve the physical properties of the composition after drying; and between about 2 wt. % and about 20 wt. % water, wherein the extrusion rate of the composition through about a 1½ mm nozzle is between about 0.05 gm/min and about 5 gm/min at a pressure of 120 PSI.

These and other aspects of the present inventions will become apparent to those skilled in the art after a reading of the following description of the embodiments when considered with the drawings.

DESCRIPTION OF THE EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Also, has used herein, sintering is the process of forming a solid mass of material by heat and/or pressure without melting it to the point of liquefaction. A material that can go through the sintering process is called a sinterable material. Once a sinterable material has gone through the sintering process, the resulting solid is a sintered material.

Figure 1:
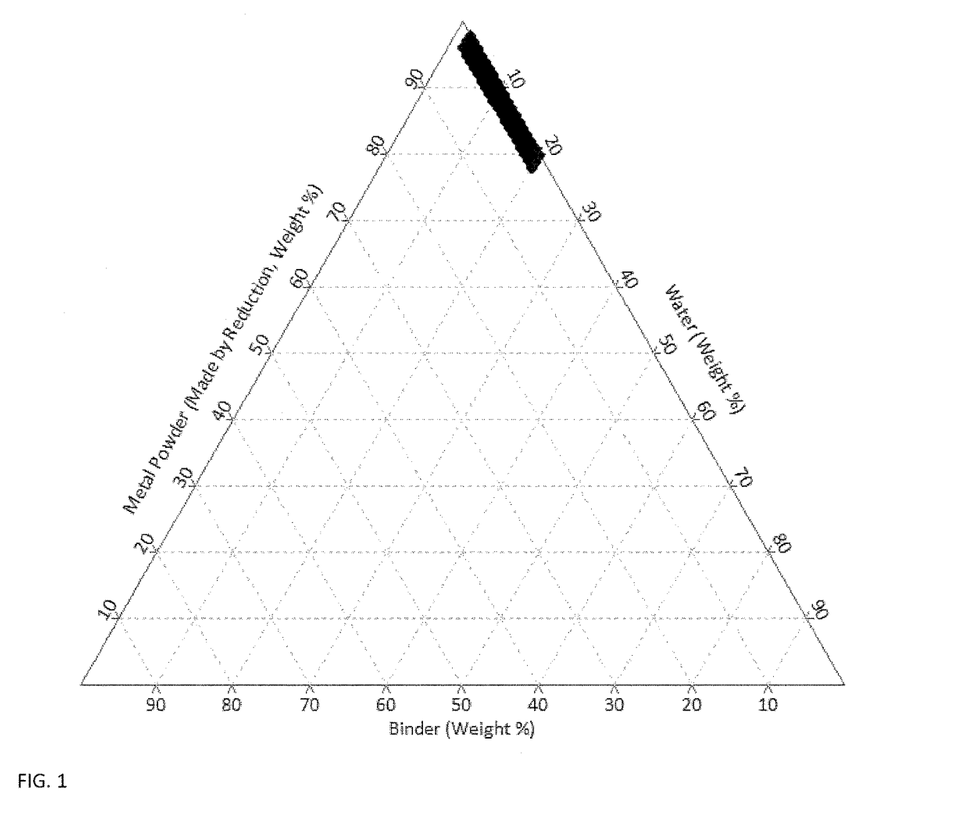
FIG. 1 is a ternary diagram of wt. % compositions for metal powder (made by reduction), binder and water constructed according to the present inventions.
Figure 2:
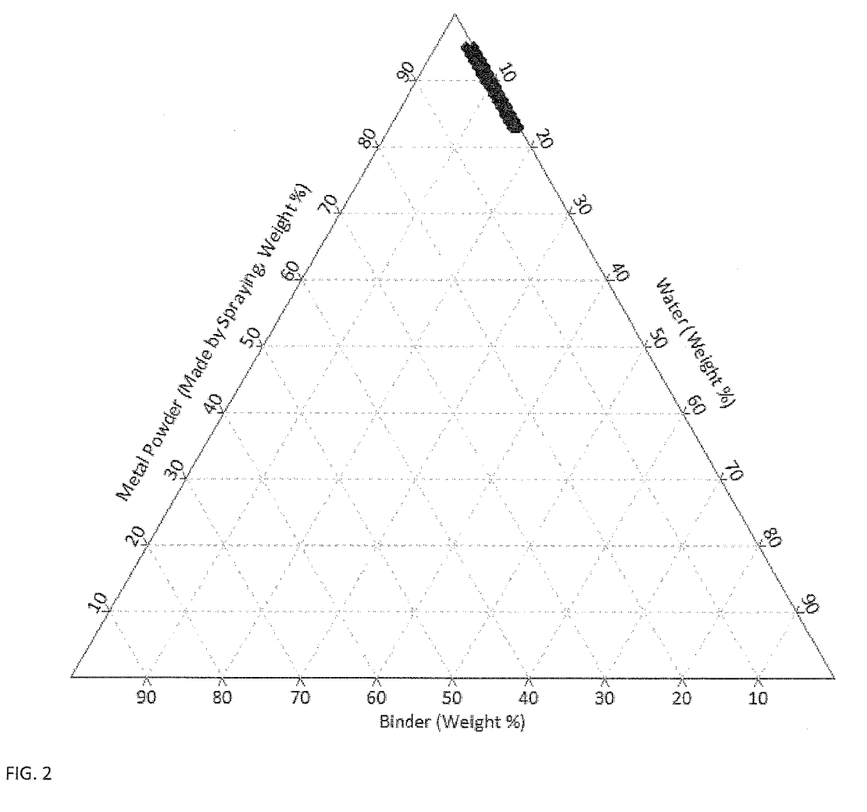
FIG. 2 is a ternary diagram of wt. % compositions for metal powder (made by spraying), binder and water constructed according to the present inventions.

Referring now to the drawings in general and FIGS. 1 and 2 in particular, it will be understood that the illustrations are for the purpose of describing embodiments of the inventions and are not intended to limit the inventions thereto.

The present inventions may be made up of the following components: (1) fine metal powders (the metal being copper, bismuth, nickel, cobalt, molybdenum, germanium, tungsten, tin, iron, vanadium, titanium, aluminum, or any alloys of these metals) or fine metal oxide powders (the metal of the oxide being those in the list of metal powders) or a mixture of one or more fine metal powders and one or more fine metal oxide powders; (2) water; (3) an organic binder such as xanthan gum, carboxymethyl-cellulose, methyl cellulose, polyvinyl alcohol, guar gum, sodium alginate, starch, or polyvinyl alcohol that forms a pseudo-plastic, viscoelastic, shear thinning dispersion in water.

Most preferably, the binder and any optional materials should be on the United States Food and Drug Administration's list of materials generally recognized as safe for addition to foods and pharmaceuticals.

Most preferably, the fine metal powders or fine metal oxide powders have a particle size equal to or less than 325 mesh so that the powder particles will pass through a small diameter extruder nozzle, and provide fine details of molded or 3D printed articles.

Figure 3:
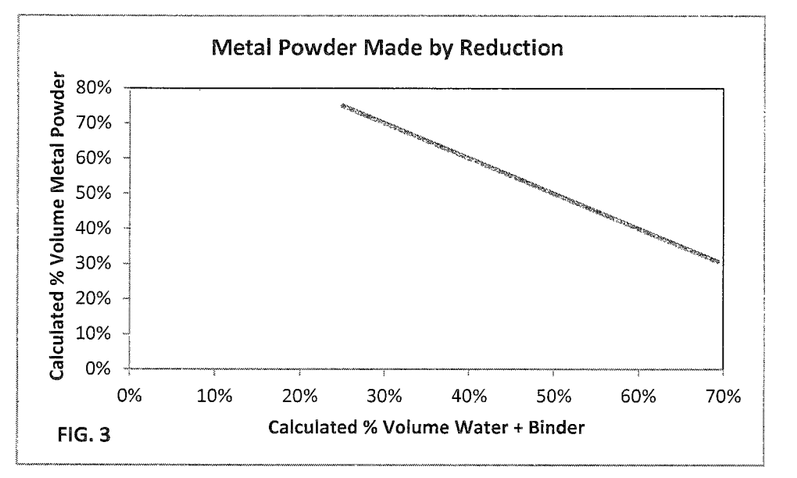
FIG. 3 is a diagram of calculated volume % compositions according to the present inventions for metal powder (made by reduction), and (binder+water), assuming a density of 8 gm/cc for metal powder and 1 gm/cc for (water+binder)
Figure 4:
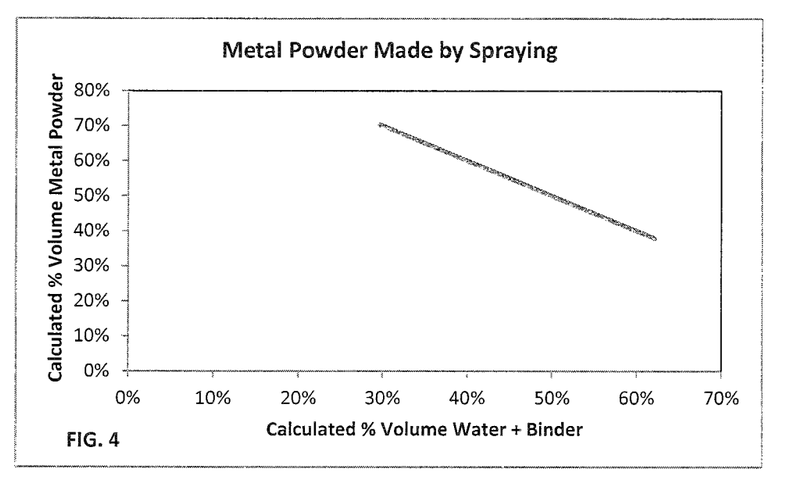
FIG. 4 shows a diagram of calculated volume % compositions according to the present inventions for metal powder (made by spraying), and (binder+water), assuming a density of 8 gm/cc for metal powder and 1 gm/cc for (water+binder)

The Applicant has discovered by extensive testing (see e.g. FIG. 1 vs FIG. 2; FIG. 3 vs FIG. 4 and also Examples 1 and 2 vs Example 3 infra.) that the quantities of metal powder, binder and water required for the composition of the present inventions are highly dependent on the size and shape of the particles that constitute the metal powder, and on the rheological properties of the metal powder and binder when dispersed in water. Specifically, it was discovered that chemically and size identical metal-based powders prepared by different processes such as reduction and spraying have substantially different characteristics for molding as discussed in further detail below.

Turning to Examples 1 and 2 vs Example 3 infra, compositions prepared according to the present inventions were tested for the following physical properties (1) its dynamic viscosity which allows extrusion through a small diameter nozzle under moderate pressure; (2) after extrusion, that the extruded material is firm so the 3D printed article will not slump, sag or flow; (3) that before or after drying, the extruded article can be refined with simple tools; and (4) that the dry extruded article will sinter into metal.

Two general methods for production of metal powders were (1) reduction of powders of metal compounds, such as oxides, to the metal powder; and (2) spraying of liquid metal into fine droplets that solidify on cooling.

Applicant also discovered that the reduction method results in particles that are irregularly shaped and exhibit a high interparticle friction when dispersed in a moldable composition. To the contrary, the spraying method results in roughly spherical particles that exhibit a low interparticle friction when dispersed in a moldable composition.

Further, Applicant discovered that the upper limit on the amount of fine metal powders and/or fine metal oxide powders in the compositions of the present inventions is determined by the requirement for extrusion through a small diameter nozzle under moderate pressure, and the lower limit is determined by the requirement for sintering of the 3D printed article into metal.

Likewise, Applicant discovered that the upper limit on the amount of binder in the composition of the present inventions is determined by the requirement for extrusion through a small diameter nozzle under moderate pressure, and the lower limit is determined by the requirement for non-sagging of the article while it is being molded or 3D printed. Also, the lower limit on the amount of water is determined by the requirement of extrusion through a small diameter nozzle with moderate pressure, and the upper limit is determined by the requirement for non-sagging during molding or printing of the article and the ability to sinter the dried article.

Thus, there is a complex interdependence of the amounts of fine metal powder, binder, and water with regard to the rheological properties of the resulting composition. Applicant has determined by its extensive testing that decrease (increase) in the proportion of metal powder can be compensated by increase (decrease) in the proportion of binder and/or decrease (increase) in the proportion of water in the composition.

As best seen in FIGS. 1 and 2, the amount of fine metal powder ranges from about 78 wt. % to about 90 wt. %, most preferably from about 81 wt. % to about 85 wt. % for powders made by reduction; and ranges from about 83 wt. % to about 95 wt. %, most preferably from about 84 wt. % to about 93 wt. % for powders made by spraying. Compositions containing larger amounts of fine metal powder are too stiff and cannot be easily extruded with moderate pressure through a small diameter nozzle, while compositions containing smaller amounts of fine metal powder cannot be sintered into metal.

As also seen in FIGS. 1 and 2, the water ranges from about 2 wt. % to about 20 wt. %, most preferably from about 14 wt. % to about 17 wt. % when the metal powders used are made by reduction; and range from about 4 wt. % to about 16 wt. %, most preferably from about 6 wt. % to about 12 wt. % when the metal powders used are made by spraying. Compositions containing smaller amounts of water are too stiff and cannot be easily extruded with moderate pressure through a small diameter nozzle, while compositions containing larger amounts of water are too soft and slump during extrusion.

As also seen in FIGS. 1 and 2, the binder ranges from about 0.2 wt. % to about 2 wt. %, most preferably from about 0.5 wt. % to about 1.5 wt. % when the metal powders used are made by reduction; and ranges from about 0.1 wt. % to about 1 wt. %, most preferably from about 0.86 wt. % to 0.98 wt. %, when the metal powders used are made by spraying or atomization. Compositions containing larger amounts of binder are too stiff and cannot be easily extruded with moderate pressure through a small diameter nozzle, while compositions containing smaller amounts of binder are too soft and a 3D printed article slumps during extrusion. The data used to generate FIGS. 1 and 2 is shown below in Examples 1, 2, and 3 and their associated Tables. Wt. % is used for all data in the below examples and tables, except for FIG. 3 and FIG. 4, instead of volume % as will be explained in more detail below.

Example 1

A 5 mL syringe fitted with a 22 gauge tapered plastic nozzle and was driven at a flow rate of 274 microliters per minute by a syringe drive. The force in Newtons used to drive the syringe was measured using a load cell. The composition was observed visually during extrusion from the nozzle to determine slumping. The metal powder was a 9:1 mixture of copper powder, made by reduction, and tin powder. The particle sizes of both powders are equal to or finer than 325 mesh. The binder was xanthan gum. Sintering was done at 1550 F for 3 hours while the sample was in a container containing activated carbon. Table 1 summarizes the results for Example 1.

TABLE 1

(data in wt. %)

| Sample | Metal Powder | Binder | Water | Newtons | Slumping | Sintering | Acceptable |
|---|---|---|---|---|---|---|---|
| A | 84.7% | 0.02% | 15.3% | Too Thick | NM | NM | No |
| B | 84.7% | 0.03% | 15.2% | Too Thick | NM | NM | No |
| C | 84.7% | 0.08% | 15.2% | Too Thick | NM | NM | No |
| D | 84.6% | 0.17% | 15.2% | Too Thick | NM | NM | No |
| E | 84.4% | 0.42% | 15.2% | Too Thick | NM | NM | No |
| F | 84.0% | 0.84% | 15.1% | Too Thick | NM | NM | No |
| G | 83.7% | 1.18% | 15.1% | Too Thick | NM | NM | No |
| H | 83.3% | 1.67% | 15.0% | Too Thick | NM | NM | No |
| I | 83.3% | 0.02% | 16.7% | Too Thin | Yes | Yes | No |
| J | 83.3% | 0.03% | 16.7% | Too Thin | Yes | Yes | No |
| K | 83.3% | 0.08% | 16.7% | 12 | Yes | Yes | No |
| L | 83.2% | 0.17% | 16.6% | 10 | Yes | Yes | No |
| M | 83.0% | 0.41% | 16.6% | 16 | Yes | Yes | No |
| N | 82.6% | 0.83% | 16.5% | 44 | Yes | Yes | No |
| O | 82.4% | 1.16% | 16.5% | Too Thick | NM | NM | No |
| P | 82.0% | 1.64% | 16.4% | Too Thick | NM | NM | No |
| Q | 84.3% | 0.31% | 15.7% | 236 | Yes | Yes | No |
| R | 83.8% | 0.32% | 16.2% | 96 | Yes | Yes | No |
| S | 84.3% | 0.63% | 15.7% | Too Thick | NM | Yes | No |
| T | 83.5% | 0.63% | 15.8% | Too Thick | NM | Yes | No |
| U | 83.3% | 0.63% | 16.1% | 43 | No | Yes | Yes |
| V | 82.8% | 0.64% | 16.5% | 25 | No | Yes | Yes |
| W | 83.0% | 0.65% | 16.3% | 39 | No | Yes | Yes |
| X | 82.6% | 0.66% | 16.8% | 30 | Yes | Yes | No |

In Table 1, "NM" indicates not measured. "Too Thick" indicates that the force needed was above the limit of the syringe drive. "Too Thin" indicates that the force needed was too little to measure with the load cell.

Example 2

The metal powders are the same as in Example 1, and the binder was methylcellulose. A 10 mL dispenser was fitted with an air pressure coupling and a plastic tapered dispensing nozzle, and the extrusion flow rate measured by weighing 5 aliquots extruded for 1 minute each, and the weights averaged. Measurement of slumping was the same as in Example 1. The flow rate in Table 1 corresponds to about 1 gm/min in Table 2. All samples sintered well using the method described in Example 1. The results, pressure used, and gauge of the nozzle are shown in Table 2.

TABLE 2

(data in wt. %)

| Sample | %Powder | %Binder | %Water | Nozzle Gauge | Pressure (PSI) | Flow gm/min | Slumping | Acceptable |
| --- | --- | --- | --- | --- | --- | --- | --- | --- |
| A | 72.0% | 1.22% | 26.7% | 22 | 60  | 0.028 | Yes  | No |
| B | 70.7% | 1.19% | 28.1% | 22 | 70  | 0.088 | Yes  | No |
| C | 72.0% | 1.22% | 26.7% | 22 | 70  | 0.031 | Yes  | No |
| D | 72.0% | 1.22% | 26.7% | 22 | 70  | 0.033 | Yes  | No |
| E | 70.7% | 1.19% | 28.1% | 22 | 80  | 0.096 | Yes  | No |
| F | 70.7% | 1.19% | 28.1% | 20 | 50  | 0.096 | Yes  | No |
| G | 72.0% | 1.22% | 26.7% | 20 | 50  | 0.029 | Yes  | No |
| H | 70.7% | 1.19% | 28.1% | 18 | 50  | 0.169 | Yes  | No |
| I | 72.0% | 1.22% | 26.7% | 18 | 50  | 0.025 | Yes  | No |
| J | 70.7% | 1.19% | 28.1% | 16 | 50  | 0.384 | Yes  | No |
| K | 72.0% | 1.22% | 26.7% | 16 | 50  | 0.081 | Yes  | No |
| L | 70.7% | 1.19% | 28.1% | 14 | 50  | 0.846 | Yes  | No |
| M | 72.0% | 1.22% | 26.7% | 14 | 50  | 0.213 | Yes  | No |
| N | 79.5% | 1.34% | 19.2% | 16 | 50  | 0.289 | Some | Partially |
| O | 81.2% | 1.37% | 17.5% | 16 | 80  | 0.144 | No   | Yes |
| P | 81.2% | 1.37% | 17.5% | 16 | 100 | 0.398 | No   | Yes |
| Q | 81.2% | 1.37% | 17.5% | 16 | 120 | 1.471 | No   | Yes |
| R | 81.2% | 1.37% | 17.5% | 14 | 120 | 1.948 | No   | Yes |
| S | 81.2% | 1.37% | 17.4% | 14 | 120 | 1.083 | No   | Yes |
| T | 81.1% | 1.37% | 17.5% | 14 | 120 | 1.167 | No   | Yes |
| U | 81.5% | 1.37% | 17.2% | 14 | 120 | 1.117 | No   | Yes |
| V | 81.6% | 1.38% | 17.0% | 14 | 120 | 0.898 | No   | Yes |
| W | 82.1% | 1.38% | 16.5% | 14 | 120 | 0.819 | No   | Yes |
| X | 82.0% | 1.38% | 16.6% | 14 | 120 | 0.550 | No   | Yes |

"Some" indicates that that slumping was evident only with taller structures. "Partially" indicates that the composition is acceptable for making articles with small heights.

Example 3

The metal powder used was spherical made by spraying of a 9:1 alloy of copper and tin. All other details were the same as Example 2. The results, pressure used, and gauge of the nozzle are shown in Table 3.

TABLE 3

(data in wt.%)

| Sample | Metal | Binder | Water | Gauge | PSI | gm/min | Slumping | Acceptable |
| --- | --- | --- | --- | --- | --- | --- | --- | --- |
| A | 91.5% | 0.96% | 7.6%  | 22 | 120 | 0.000 | NM   | No |
| B | 90.6% | 0.91% | 8.5%  | 22 | 120 | 0.057 | No   | Yes |
| C | 89.8% | 0.93% | 9.3%  | 22 | 120 | 0.300 | Some | Partially |
| D | 89.0% | 0.90% | 10.1% | 22 | 120 | 0.770 | Yes  | No |
| E | 89.0% | 0.90% | 10.1% | 22 | 60  | 0.229 | Yes  | No |
| F | 91.5% | 0.96% | 7.6%  | 20 | 120 | 0.019 | No   | Slow |
| G | 90.6% | 0.91% | 8.5%  | 20 | 120 | 0.115 | No   | Yes |
| H | 89.8% | 0.93% | 9.3%  | 20 | 120 | 0.730 | Some | Partial |
| I | 89.0% | 0.90% | 10.1% | 20 | 60  | 0.537 | Yes  | No |
| J | 91.5% | 0.96% | 7.6%  | 18 | 120 | 0.015 | No   | Slow |
| K | 90.6% | 0.91% | 8.5%  | 18 | 120 | 0.088 | No   | Yes |
| L | 89.8% | 0.93% | 9.3%  | 18 | 120 | 0.815 | Some | Partial |
| M | 89.0% | 0.90% | 10.1% | 18 | 60  | 0.477 | Yes  | No |
| N | 91.5% | 0.96% | 7.6%  | 16 | 120 | 0.036 | No   | Slow |
| O | 90.6% | 0.91% | 8.5%  | 16 | 120 | 0.267 | No   | Yes |
| P | 89.8% | 0.93% | 9.3%  | 16 | 120 | 1.870 | Some | Partial |
| Q | 89.0% | 0.90% | 10.1% | 16 | 60  | 1.146 | Yes  | No |
| R | 91.5% | 0.96% | 7.6%  | 14 | 120 | 0.061 | No   | Slow |

TABLE 3-continued (data in wt.%)

| Sample | Metal | Binder | Water | Gauge | PSI | gm/min | Slumping | Acceptable |
|---|---|---|---|---|---|---|---|---|
| S | 90.6% | 0.91% | 8.5% | 14 | 120 | 0.726 | No | Yes |
| T | 89.8% | 0.93% | 9.3% | 14 | 120 | 4.846 | Some | Partial |
| U | 89.0% | 0.90% | 10.1% | 14 | 60 | 2.742 | Yes | No |

"NM" indicates not measured; "Slow" indicates that the flow rate is too slow for 3D printing at the indicated pressure. "Some" indicates that that slumping was evident only with taller structures. "Partially" indicates that the composition is acceptable for making articles with small heights.

It is important to understand the Applicant's rational for wt. % used in FIG. 1; FIG. 2; and FIG. 5 instead of volume %.

A. Conversion weight to volume for the metal powder is straightforward by dividing the weight by the known bulk density of the metal powder.

B. Likewise, while the conversion of weight to volume for water should be corrected for the amount of water firmly bound to the binder and to the surface of the metal particles, because the density of the bound water is likely to be larger than the density of water that is not so bound but to a first approximation this correction is likely to be small and may be neglected.

C. However, conversion of weight to volume for the binder, for example, xanthan gum, is problematic. Although the hydrodynamic volume of a xanthan gum molecule has been determined by several methods including light scattering, viscosity, and gel permeation chromatography, this is the volume of independent, non-interacting gum molecules. At concentrations above a critical concentration, $c^*$ (about 0.03 wt. % for xanthan gum) the molecules start to interact with each other due to the overlap of the polymer coils.

Polymer chemists define a second critical concentration, $c^{}$ (about 0.14 wt. % for xanthan gum), and also a third critical concentration, $c'$ (about 0.7 wt. % for xanthan gum) because the physical properties of solutions of polymers undergo what appear to be phase changes. The phase between $c^{}$ and $c'$ is called the isotropic phase, and that above $c'$ is called the mesophase (a mixture of isotropic and liquid crystalline phases).

So, the volume occupied by xanthan gum rises very rapidly between $c^{**}$ and $c'$, and above $c'$ the volume of the gum is essentially 100% of the solution volume.

Regarding the moldable composition of the present inventions, the volume % of binder, for example, xanthan gum, would be the same as the calculated volume % of water since the wt. % of the xanthan gum in the water phase of the composition is several times $c'$. Even more interesting, the "effective" hydrodynamic volume of xanthan gum molecules as determined by viscosity becomes smaller as the shear rate increases. Accordingly, calculation of the volume % occupied by the binder is meaningless and wt. % is used for all data in the above examples and tables except for FIG. 3 and FIG. 4.

Figure 5:
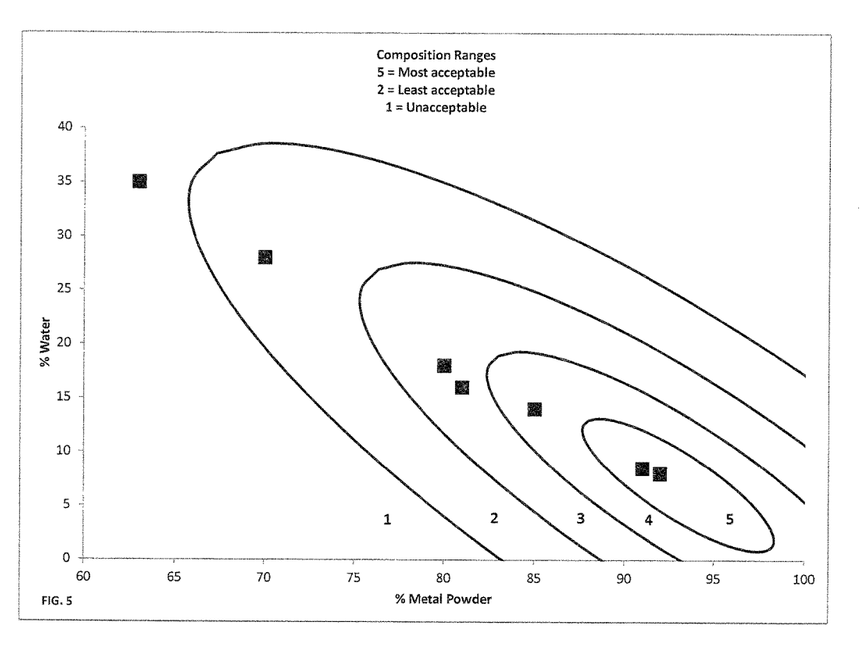
FIG. 5 is a graphical representation of a response surface illustrating acceptable ranges and an unacceptable range for wt. % compositions according to the present inventions for water and metal powders, where the value "5" is the most acceptable, the value "2" is least acceptable and the value "1" is unacceptable.

Turning finally to FIG. 5, there is shown a graphical representation of a response surface illustrating acceptable ranges and an unacceptable range for wt. % compositions according to the present inventions for water and metal powders, where the value "5" is the most acceptable, the value "2" is least acceptable and the value "1" is unacceptable. The response surface provides a visual illustration of the effects of both the amount of metal powder and the amount of water (for a constant binder amount) via a two-dimensional surface plot of a three-dimensional surface. As can be seen by the general "slope" of the ellipses, the amount of water has more effect than the amount of metal powder almost 2 to 1. Also, it can be seen clearly that surprisingly a low water/high metal powder composition may be extruded while, at the same time, is still stable after extruding.

As may be appreciated from the above discussion and examples, the moldable composition of the present inventions is unique when compared with other known materials and solutions for producing metal articles by molding or utilizing a 3D printer because the present inventions provide: (1) a composition for use in 3D printers; (2) a composition that will flow through a fine extrusion nozzle under moderate pressure; (3) a composition, that when molded or extruded, results in a three dimensional article that is firm and does not sag during forming or printing; (4) a composition that when molded or 3D printed into a three-dimensional article, such article may be refined with simple tools; (5) a composition that when dried after molding or extrusion into a three-dimensional article, may be sintered into a metal article; and (6) a composition that when dried after molding or extrusion into a three-dimensional article, may be sintered into a metal article in a kiln while in a container containing activated carbon.

The present inventions are unique in that they are structurally different from other known materials for producing metal articles by molding or with a 3D printer. More specifically, the present inventions are unique due to the presence of: (1) physical characteristics needed for extrusion through a fine nozzle utilizing a moderate pressure; (2) physical characteristics needed for non-sagging of the molded or 3D printed article during molding or extrusion; (3) physical characteristics needed for finishing the details of the molded or 3D printed article with simple tools before or after the article is dried; (4) physical and chemical characteristics needed to enable sintering of the dried article to produce a metal article in a kiln; and, (5) physical and chemical characteristics needed to enable sintering of the dried article to produce a metal article in a kiln while the article is in a container containing activated carbon.

Certain modifications and improvements will occur to those skilled in the art upon a reading of the foregoing description. By way of example, small amounts of non-sinterable and refractory metal powders may be added to the present inventions to provide other desirable physical and chemical characteristics. Also, other additives such as boron for promoting grain refinement; phosphorous for lowering the sintering temperature; and buffers for increasing stability of the compositions by controlling pH may be added. It should be understood that all such modifications and improvements have been deleted herein for the sake of conciseness and readability but are properly within the scope of the following claims.

I claim:

1. An extruded composition for use in machine forming an article, said extruded composition comprising:
   (a) at least one fine, sinterable metal-based powder;
   (b) a water dispersible binder; and
   (c) the balance water, wherein the extrusion rate of said extruded composition through about a 1½ mm nozzle is between about 18,000 Pascal seconds and about 1,800,000 Pascal seconds at a pressure of 120 PSI.

2. The composition according to claim 1, further including up to about 2 wt. % of molding additives to improve the stability of said extruded composition by reducing the rate of oxidation of the metal-based powder during storage and forming and to improve the physical properties of the article after forming and drying by remaining hand carvable prior to sintering.

3. The composition according to claim 2, wherein the molding additives are selected from the group consisting of ethanol, isopropyl alcohol, propylene glycol, glycerol, polyethylene glycol, polyoxyethylene, polyvinyl alcohol and mixtures thereof.

4. The composition according to claim 1, wherein the metal-based powders are selected from the group consisting of fine metal powders, fine metal oxide powders and mixtures thereof.

5. The composition according to claim 4, wherein the fine metal powders are selected from the group consisting of fine metal powders, the oxides of which can be reduced by carbon monoxide, such as copper, bismuth, nickel, cobalt, molybdenum, germanium, tungsten, tin, iron, vanadium, alloys of these metals and mixtures thereof.

6. The composition according to claim 4, wherein the fine metal powders are selected from the group consisting of fine metal powders, the oxides of which cannot be reduced by carbon monoxide, such as titanium, aluminum, alloys of these metals with copper, bismuth, nickel, cobalt, molybdenum, germanium, tungsten, tin, iron, vanadium and mixtures thereof.

7. The composition according to claim 4, wherein the fine metal oxide powders are selected from the group consisting of fine metal oxide powders which can be reduced by carbon monoxide, such as copper oxide, bismuth oxide, nickel oxide, cobalt oxide, molybdenum oxide, germanium oxide, tungsten oxide, tin oxide, iron oxide, vanadium oxide and mixtures thereof.

8. The composition according to claim 4, wherein the fine metal oxide powders are selected from the group consisting of fine metal oxide powders which cannot be reduced by carbon monoxide, such as titanium oxide, aluminum oxide and mixtures thereof.

9. The composition according to claim 1, wherein the metal-based powders are about 325 mesh.

10. The composition according to claim 9, wherein the metal-based powders are less than about 325 mesh.

11. The composition according to claim 1, wherein the water dispersible binder is selected from the group consisting of xanthan gum, carboxymethyl-cellulose, methyl cellulose, polyvinyl alcohol, guar gum, sodium alginate, starch, polyvinyl alcohol and mixtures thereof.

12. The composition according to claim 1, wherein said extruded composition is adapted for extrusion through a fine nozzle.

13. The composition according to claim 12, wherein said extruded composition is adapted for extrusion through a fine nozzle having a diameter of about ½ mm.

14. The composition according to claim 12, wherein said extruded composition is adapted for extrusion through a fine nozzle having a diameter of between about ½ mm and about 1½ mm.

15. The composition according to claim 1, wherein said extruded composition is adapted for extrusion by a 3D printer.

16. An extruded composition for use in machine forming an article, said extruded composition comprising:
   (a) at least 78 wt. % of one fine metal-based powder;
   (b) between about 0.2 wt. % and less than about 1.5 wt. % of a water dispersible binder; and
   (c) between about 2 wt. % and about 20 wt. % water, wherein the extrusion rate of said extruded composition through about a 1½ mm nozzle is between about 18,000 Pascal seconds and about 1,800,000 Pascal seconds at a pressure of 120 PSI.

17. The composition according to claim 16, wherein the proportion of the fine metal-based powders is between about 78 wt % and about 90 wt. % when the shape of the powder particles is irregular such as metal powder made by reduction.

18. The composition according to claim 16, wherein the proportion of the fine metal-based powders is between about 83 wt. % and about 95 wt. % when the shape of the powder particles is roughly spherical such as metal powder made by spraying or atomization.

19. An extruded composition for use in machine forming an article, said extruded composition comprising:
   (a) at least 78 wt. % of one fine metal-based powder;
   (b) between about 0.2 wt. % and less than about 1.5 wt. % of a water dispersible binder;
   (c) up to about 2 wt. % of molding additives to improve the stability of said extruded composition by reducing the rate of oxidation of the metal-based powder during storage and forming and to improve the physical properties of the article after forming and drying by remaining hand carvable prior to sintering; and
   (d) between about 2 wt. % and about 20 wt. % water, wherein the extrusion rate of said extruded composition through about a 1½ mm nozzle is between about 18,000 Pascal seconds and about 1,800,000 Pascal seconds at a pressure of 120 PSI.

20. The composition according to claim 19, wherein the molding additives are selected from the group consisting of ethanol, isopropyl alcohol, propylene glycol, glycerol, polyethylene glycol, polyoxyethylene, polyvinyl alcohol and mixtures thereof.

21. The composition according to claim 19, wherein the metal-based powders are selected from the group consisting of fine metal powders, fine metal oxide powders and mixtures thereof.

22. The composition according to claim 21, wherein the fine metal powders are selected from the group consisting of fine metal powders, the oxides of which can be reduced by carbon monoxide, such as copper, bismuth, nickel, cobalt, molybdenum, germanium, tungsten, tin, iron, vanadium, alloys of these metals and mixtures thereof.

23. The composition according to claim 21, wherein the fine metal powders are selected from the group consisting of fine metal powders, the oxides of which cannot be reduced by carbon monoxide, such as titanium, aluminum, alloys of these metals with copper, bismuth, nickel, cobalt, molybdenum, germanium, tungsten, tin, iron, vanadium and mixtures thereof.

24. The composition according to claim 21, wherein the fine metal oxide powders are selected from the group consisting of fine metal oxide powders which can be reduced by carbon monoxide, such as copper oxide, bismuth oxide, nickel oxide, cobalt oxide, molybdenum oxide, germanium oxide, tungsten oxide, tin oxide, iron oxide, vanadium oxide and mixtures thereof.

25. The composition according to claim 21, wherein the fine metal oxide powders are selected from the group consisting of fine metal oxide powders which cannot be reduced by carbon monoxide, such as titanium oxide, aluminum oxide and mixtures thereof.

26. The composition according to claim 19, wherein the metal-based powders are about 325 mesh.

27. The composition according to claim 26, wherein the metal-based powders are less than about 325 mesh.

28. The composition according to claim 19, wherein the water dispersible binder is selected from the group consisting of xanthan gum, carboxymethyl-cellulose, methyl cellulose, polyvinyl alcohol, guar gum, sodium alginate, starch, polyvinyl alcohol and mixtures thereof.

29. The composition according to claim 19, wherein said extruded composition is adapted for extrusion through a fine nozzle.

30. The composition according to claim 29, wherein said extruded composition is adapted for extrusion through a fine nozzle having a diameter of about ½ mm.

31. The composition according to claim 29, wherein said extruded composition is adapted for extrusion through a fine nozzle having a diameter of between about ½ mm and about 1½ mm.

32. The composition according to claim 19, wherein said extruded composition is adapted for extrusion by a 3D printer.

33. The composition according to claim 19, wherein the proportion of the fine metal-based powders is between about 78 wt. % and about 90 wt. % when the shape of the powder particles is irregular such as metal powder made by reduction.

34. The composition according to claim 19, wherein the proportion of the fine metal-based powders is between about 83 wt. % and about 95 wt. % when the shape of the powder particles is roughly spherical such as metal powder made by spraying or atomization.

* * * * *